UNITED STATES PATENT OFFICE.

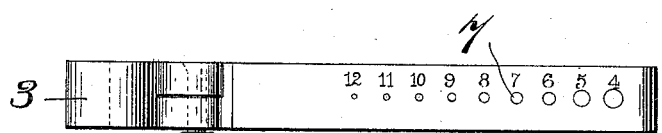
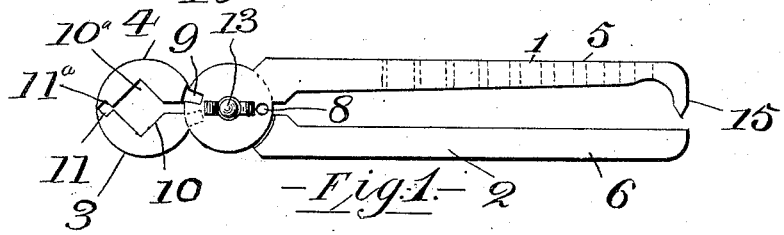
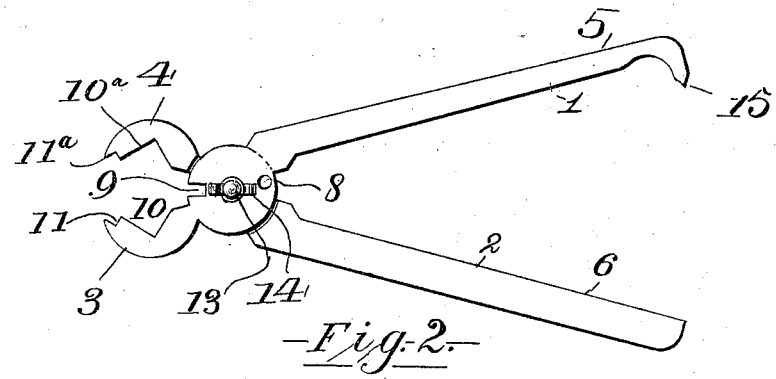
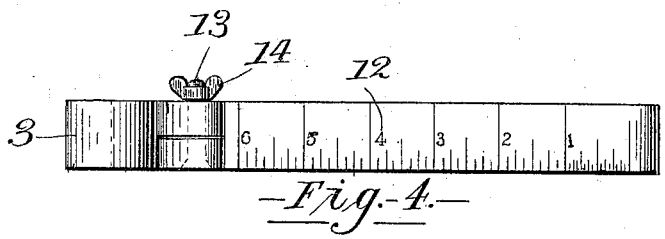

BARTON B. FELTUS, OF BOOLCOOMATTA STATION, MINGARY, SOUTH AUSTRALIA.

WIREWORKING-TOOL.

SPECIFICATION forming part of Letters Patent No. 645,076, dated March 13, 1900.

Application filed August 6, 1898. Renewed July 5, 1899. Serial No. 722,867. (No model.)

*To all whom it may concern:*

Be it known that I, BARTON BALFOUR FELTUS, boundary-rider, a subject of the Queen of Great Britain, residing at Boolcoomatta Station, Mingary, in the Province of South Australia, have invented a certain new and Improved Tool for Straining and Twisting Wire in the Construction of Fences, of which the following is a specification.

My invention relates to a new and useful improvement in compound or combination implements particularly intended for use by fence-makers, boundary-riders, ranchmen, and laborers of outlying districts.

The object of the invention is the production of an implement of novel construction embodying in a novel manner a number of tools for different purposes.

To this end the invention consists in the novel construction, arrangement, and combination of parts hereinafter fully set forth, and pointed out in the claims, reference being made to the accompanying drawings, in which—

Figure 1 is a plan view of the compound implement with the jaws closed. Fig. 2 is a similar view showing the jaws in open position and illustrating the operation of the wire-cutting portion of the implement. Fig. 3 is a side view illustrating one of the members of the implement constructed to provide a wire-gage. Fig. 4 is a side view showing the other member provided with a graduated scale.

In the said drawings the reference-numerals 1 and 2 designate the two rectilinear handle members of the compound implement, which may be manufactured of any suitable material, such as steel. These rectilinear handle members are pivoted together near one end, thus providing jaws 3 and 4, the opposite end portions of the members serving as handles 5 and 6. The handle member 1 is formed in rear of its pivotal connection to the handle member 2, with a series of graduated perforations 7, forming a wire-gage, and in advance of the said wire-gage and contiguous to the point of pivotal connection is a hole 8, drilled in the member 1 and adapted to receive the end of a wire for the purpose of tightening and twisting the same, and this feature is particularly intended for use when the implement is used in the construction of wire fences.

In advance of the point of pivotal connection the jaw portion 3 of the member 1 is formed with a notch 9, which coöperates with a similar notch formed in the member 2 to provide a wire-cutter. In the operation of cutting wire the tool is opened to the position shown in Fig. 2 of the drawings, in which position the recesses 9 in the members 1 and 2 are in alinement to receive the wire to be cut. The handles of the tool are then closed together, as illustrated in Fig. 1 of the drawings, and during the closing movement the cutting edges of the notches sever the wire.

The interior face of the jaw portion of the member 1 is provided with two angular recesses 10 and 11, differing in size, which when the jaws are closed together form, with similar recesses in the jaw of the member 2, complete rectangular recesses adapted to serve as pipe-wrenches of different sizes, and the points of the jaws are adapted to perform the function of pincers, the sharp edges formed by the smaller angular recesses providing efficient gripping-points.

The member 2 in rear of the point of pivotal connection is provided with a graduated scale 12, as shown, and the face thereof is straight, so that this member may also serve as a rule or straight-edge.

The jaw portion 4 of the member 2 is, as hereinbefore stated, provided with a pair of angular recesses $10^a$ and $11^a$, one being larger than the other and corresponding to the similar recesses 9 and 10 in the member 1.

When the jaws are opened to the position shown in Fig. 2, the angular recesses 10 and $10^a$ are adapted to perform the function of pipe-wrenches, as are also the recesses 9 and $9^a$, the latter serving for pipes of smaller dimensions.

The detachable pivot and clamp connection of the two handle members is composed of a single pivot-bolt 13, passing straight through two coincident bolt-holes formed in the handle members in juxtaposition to the wire-receiving hole 8, and a thumb-nut 14 screwed upon a screw-thread formed on the end portion of the bolt opposite its rigid head. This bolt-head is countersunk in one of the handle members to lie flush with the side surface thereof. The coincident bolt-holes, single straight bolt passing therethrough, and the thumb-nut enable the two handle members to be quickly separated or assembled and to be pivotally connected or rigidly clamped together in any position to which the jaws and handle members may be adjusted. This construction is of particular advantage, in that when the jaws are closed in the position shown in Fig. 1 the thumb-nut may be screwed home and the jaws held rigid, and when in this position the rectangular recess formed by the angular recesses 10 10$^a$ constitutes a spanner. The countersinking of the bolt admits of the implement being laid flat on that surface when it is desired to make use of the graduated scale or rule formed on the member 2.

The rear end of the member 1 is hooked, as shown at 15, and provided with a chisel-point to serve as a tool for removing the bark or other growths from posts and the like in the construction of fences and previous to training of wire thereon.

The faces of the angular recesses 9 9$^a$ and 10 10$^a$ are serrated to increase their gripping action when used as pipe-wrenches and for other similar purposes.

By my invention I provide a compound or combination implement of novel construction and novel arrangement adapted for various purposes and embodying in the one implement a number of tools for performing different operations. The implement is extremely convenient to workmen and others in outlying districts, as it avoids the incumbrance and inconvenience of carrying a large kit of tools.

Having thus described my invention, what I claim is—

1. A wireworking-tool, consisting of two handle members 1 and 2, having the wire-receiving hole 8, the two jaws 3 and 4 formed respectively, with the angular recesses 10, 11 and 10$^a$, 11$^a$, the opposing wire-cutting notches 9 at the junction of the jaws with the handle members, and devices for detachably pivoting the handle members together and rigidly clamping them in fixed relation with the jaws open or separated for use as a spanner, substantially as and for the purpose described.

2. A wireworking-tool, comprising two handle members 1 and 2, having the wire-receiving hole 8, the two jaws 3 and 4, formed respectively, with the angular recesses 10, 11, and 10$^a$, 11$^a$, and the opposing wire-cutting notches 9 at the junction of the jaws with the handle members, substantially as and for the purposes described.

In testimony whereof I have hereunto set my hand in presence of two subscribing witnesses.

BARTON B. FELTUS.

Witnesses:
 EDWIN B. COLTON,
 CHARLES S. BURGESS.